C. B. PETTENGILL.
Suspender for Vases and Flower-Pots.
No. 225,020. Patented Mar. 2, 1880.
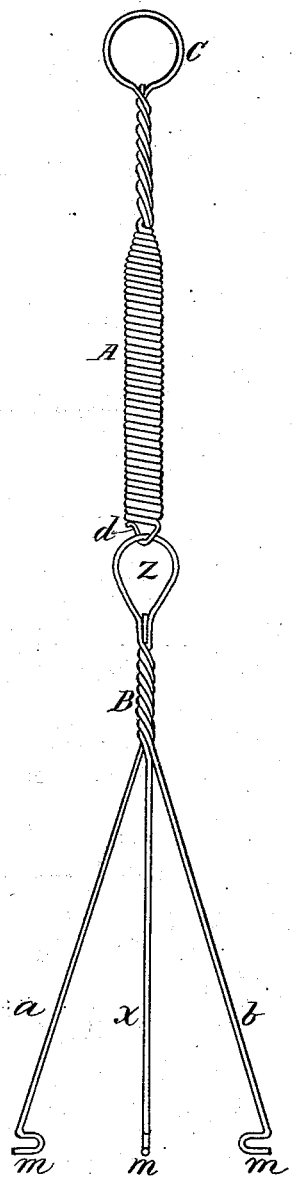

UNITED STATES PATENT OFFICE.

CHARLES B. PETTENGILL, OF EAST BROOKFIELD, MASSACHUSETTS.

SUSPENDER FOR VASES AND FLOWER-POTS.

SPECIFICATION forming part of Letters Patent No. 225,020, dated March 2, 1880.

Application filed October 17, 1879.

*To all whom it may concern:*

Be it known that I, CHARLES B. PETTENGILL, of East Brookfield, in the county of Worcester, State of Massachusetts, have invented a certain new and useful Improvement in Suspenders for Vases or Flower-Pots, of which the following is a description sufficiently full, clear, and exact to enable any person skilled in the art or science to which my invention appertains to make and use the same, reference being had to the accompanying drawings, forming a part of this specification, in which—

Figure 1 is a side elevation of the suspender, and Fig. 2 a like view, showing the same elongated.

Like letters of reference indicate corresponding parts in the different figures of the drawings.

My invention relates to that class of vase-suspenders which are vertically adjustable; and it consists in a novel construction and arrangement of the parts, as hereinafter more fully set forth and claimed, by which a simpler, cheaper, and more effective device of this character is produced than is now in ordinary use.

In the drawings, A represents the body of the suspender, and B the tripod or supporter. The body is formed of wire coiled in a spiral and provided with the rings or loops $c$ and $d$. The supporter is also formed of wire, and is provided with the loop $z$ and arms $a\ b\ x$, having the hooks $m\ m\ m$ at their lower ends.

In the use of my improvement the loops $z\ d$ are connected together, as shown in Fig. 1, and the loop $c$ attached to a suspensory bracket, (not shown,) the pot or vase to be supported being secured to the body of the tripod B by means of the hooks $m\ m\ m$. The vase, after being attached to the hooks $m$ and suspended by the loop $c$, may readily be brought into a lower position by stretching the body A to such an extent as to leave it permanently elongated, as shown in Fig. 2, thus adjusting it vertically, as desired.

I am aware that Letters Patent were granted to one O'Neil, dated April 12, 1870, and numbered 101,907, for an improvement in flower-pot stands; also, that E. C. Ford was granted Letters Patent 174,669, dated March 14, 1876, and J. Maxheimer Letters Patent 180,432, dated August 1, 1876, for improvements in hooks; but the devices described in these several Letters Patent are essentially different from my invention, and I therefore do not herein claim anything shown or described in either of said several Letters Patent when in and of itself considered.

I am also aware that in Letters Patent No. 170,845, dated December 7, 1875, a coiled-wire support or spring is shown for suspending bird-cages; but said spring is not provided with a tripod, like the spring in my suspender, adapting it for supporting vases or flower-pots and maintaining them in a proper position when suspended.

I am also aware that spring-supports are in common use for various purposes, and therefore do not claim the same broadly; neither do I claim anything shown or described in said Patent No. 170,845, when in and of itself considered.

Having thus explained my invention, what I claim is—

A wire grasping device for vases, consisting of a loop, a twisted shank, and a tripod composed of springing downwardly-diverging arms $a\ b\ x$, provided with hooks at their lower ends to grasp and hold the vase, in combination with elastic suspender A, substantially as described.

CHARLES B. PETTENGILL.

Witnesses:
SAMUEL D. COLE,
JOHN G. AMY.